US007725340B2

(12) United States Patent
Reisz et al.

(10) Patent No.: US 7,725,340 B2
(45) Date of Patent: May 25, 2010

(54) RANKING-BASED METHOD FOR EVALUATING CUSTOMER PREDICTION MODELS

(75) Inventors: Claudia Reisz, Mount Kiscoe, NY (US); Saharon Rosset, Mount Kiscoe, NY (US); Bianca Zadrozny, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 12/050,371

(22) Filed: Mar. 18, 2008

(65) Prior Publication Data
US 2008/0221954 A1    Sep. 11, 2008

Related U.S. Application Data

(63) Continuation of application No. 11/456,663, filed on Jul. 11, 2006.

(51) Int. Cl.
*G06F 17/18* (2006.01)
(52) U.S. Cl. .............................. 705/7; 705/10; 707/100; 703/2; 714/25
(58) Field of Classification Search ...................... 705/7, 705/10; 707/100; 703/2; 714/25
See application file for complete search history.

(56) References Cited

U.S. PATENT DOCUMENTS

| 6,430,539 | B1 | 8/2002 | Lazarus ....................... 705/10 |
| 7,072,794 | B2* | 7/2006 | Wittkowski ................. 702/179 |
| 7,219,099 | B2* | 5/2007 | Kuntala et al. .............. 707/100 |
| 7,451,065 | B2* | 11/2008 | Pednault et al. ................ 703/2 |
| 7,533,038 | B2* | 5/2009 | Blume et al. .................. 705/10 |
| 2003/0182281 | A1 | 9/2003 | Wittkowski ..................... 707/5 |
| 2005/0195982 | A1* | 9/2005 | Olive .......................... 381/59 |
| 2006/0293915 | A1 | 12/2006 | Glenn .......................... 705/1 |

OTHER PUBLICATIONS

Arsham, Business Statistics, p. 1-58, retrieved from web.archive.org, May 8, 2005, http://web.archive.org/web/20050812083358/http://ubmail.ubalt.edu/~harsham/Business-stat/opre504.htm.*
Schreuder et al., Statistical Techniques for Sampling and Monitoring Natural Resources, Apr. 2004, p. 1-111.*
Lumley and Heagerty, Weighted Empirical Adaptive variance estimators for correlated data regression, J. R. Statist. Soc. B (1999), Col. 61, Part 2, p. 459-77.*
Whitlock, Tests of relationships between numerical variables, Sept. 10, 2005, p. 1-24, http://www.zoology.ubc.ca/~whitlock/bio300/LectureNotes/Regression/Regression.html.*

* cited by examiner

*Primary Examiner*—Beth V Boswell
*Assistant Examiner*—Justin M Pats
(74) *Attorney, Agent, or Firm*—Whitham, Curtis, Christofferson & Cook, P.C.; Stephen C. Kaufman

(57) ABSTRACT

A method and system perform ranking-based evaluations for regression models that are often appropriate for marketing tasks and are more robust to outliers than traditional residual-based performance measures. The output provided by the method and system provides visualization that can offer insights about local model performance and outliers. Several models can be compared to each other to identify the "best" model and, therefore, the "best" model data for the particular marketing task.

7 Claims, 4 Drawing Sheets

RANKING-BASED METHOD FOR EVALUATING CUSTOMER PREDICTION MODELS

CROSS-REFERENCE TO RELATED APPLICATIONS

This application is a continuation of and claims priority to pending U.S. application Ser. No. 11/456,663, filed Jul. 11, 2006.

BACKGROUND OF THE INVENTION

1. Field of the Invention

The present invention generally relates to evaluation of scoring models and, more particularly, to the use of ranking-based measures to evaluate the performance of regression models. The invention has particular application to evaluation of prediction models with regard to the ranking of customers and/or potential customers according to their potential to spend for goods and services.

2. Background Description

Evaluating prediction models of customers according to their potential to spend has been done through residual-based measures; i.e., the difference between the predicted and actual spending by some known customers. This approach suffers from two main drawbacks: (1) it is non-robust to outliers (for example, gross errors in the data used for evaluation), and (2) it is not the appropriate measure if the goal is just to identify the best prospective customers.

The standard approach to evaluating regression models on holdout data is through additive, residual-based loss functions, such as squared error loss or absolute loss. These measures are attractive from a statistical perspective as they have likelihood interpretations and because, from an engineering or scientific perspective, they often represent the "true" cost of the prediction errors.

Other approaches to regression model evaluation include Regression Error Curves, where the model is evaluated according to its error rate at different levels of "error tolerance"; and using medians of the absolute deviations (MAD), rather than their mean, as the error measure:

$$\text{MAD} = \text{Median}(|r_1|, \ldots, |r_n|) \quad (1)$$

There are many companies with relatively small wallet size and a few companies with very large wallet size. Therefore, evaluation measures such as mean squared error and mean absolute error can be greatly influenced by a small subset of companies that have very large wallets and for which the models are more likely to make larger absolute errors. On the other hand, measures such as median squared error can completely ignore the performance of the model on the companies with large IT wallet size, which are usually the most important customers. An approach that is often used to mitigate the effects of a skewed distribution (especially in modeling) is to transform the numbers to a logarithmic scale. This approach, however, is not adequate for the evaluation of prediction models, since log-dollars is a unit that does not have a clear financial meaning and, therefore, cannot be used in conjunction with other financial variables such as budget and costs.

SUMMARY OF THE INVENTION

In an exemplary embodiment of the present invention, there is provided a method for identifying target customers and/or potential customers that have the largest spending budgets.

In another exemplary embodiment of the present invention, there is provided a method for evaluation that is more robust to gross errors in the data used for evaluation than the residual-based evaluation methods.

According to the invention, there is provided a method for evaluating customer prediction models that enables an organization to more accurately target customers and/or potential customers for sales and marketing efforts. This evaluation method considers various models that have generated customer prediction data. By evaluating the models $(m_1, \ldots, m_k)$, the user can have improved confidence in the targeting of the particular customers. Furthermore the evaluation can be done on a single model $(\hat{y}=m(x))$ to verify the ranking of customers and/or potential customers according to their potential to spend. The invention is intended to provide the "best" set of target customers through the use of ranking-based measures, which evaluate the performance of the model m(x) by sorting the predicted customer spending from "small" to "large". "Best" can be defined in many ways but may include those customers that have the largest potential spending budget which is also referred to as "wallet size".

The invention provides a computer-implemented ranking-based method for evaluating regression models by obtaining predictions $\hat{y}$ from one or more models to be evaluated on a test set of customers for which the true value y of the quantity of interest has been observed. This test set resides in an electronic database. The test set is sorted in increasing order such that "large" corresponds to one of a plurality of customers and/or potential customers with largest perceived spending budget, and "small" corresponds to one of a plurality of customers and/or potential customers with smallest perceived spending budget. All models are applied to the customer data from the test set and predictions for the spending for each model and customer are obtained. The predictions are converted into ranks and stored for each model in one or more electronic databases as a model ranking table. The number of ranking order switches relative to the ranking of the observed customer spending is calculated for each model. Ranking order switches are defined as those changes in ranking position of the prediction relative to the order of the true observations y. A measure of the magnitude of erroneous ranking is calculated from a weighted sum of ranking order switches. The method then transforms the number of ranking switches and weighted sum of ranking order switches into a range of [−1, 1] wherein −1 corresponds to making all possible errors (inverse ranking) and 1 corresponds to a perfect model wherein said number of ranking switches has been transformed to represent a difference between a probability that the ranking of two customers and/or potential customers are in the same order versus the probability that two of the customers and/or potential customers are in different orders from the originally obtained rank. These measures are then normalizing into a range of [0,1] wherein 1 corresponds to perfect ranking and 0 corresponds inverse ranking. At this point, the variance of the measures of order switches is calculated and confidence intervals for each ranking measure are determined. Finally, the model performance table is updated with the ranking measures and their confidence intervals. These findings as well as graphical representations thereof can be provided to a domain expert, who will choose based on this information the best model m* of the one or more models evaluated. The predictions of $\hat{y}=m^*(x)$ are stored in the optimal prediction table.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
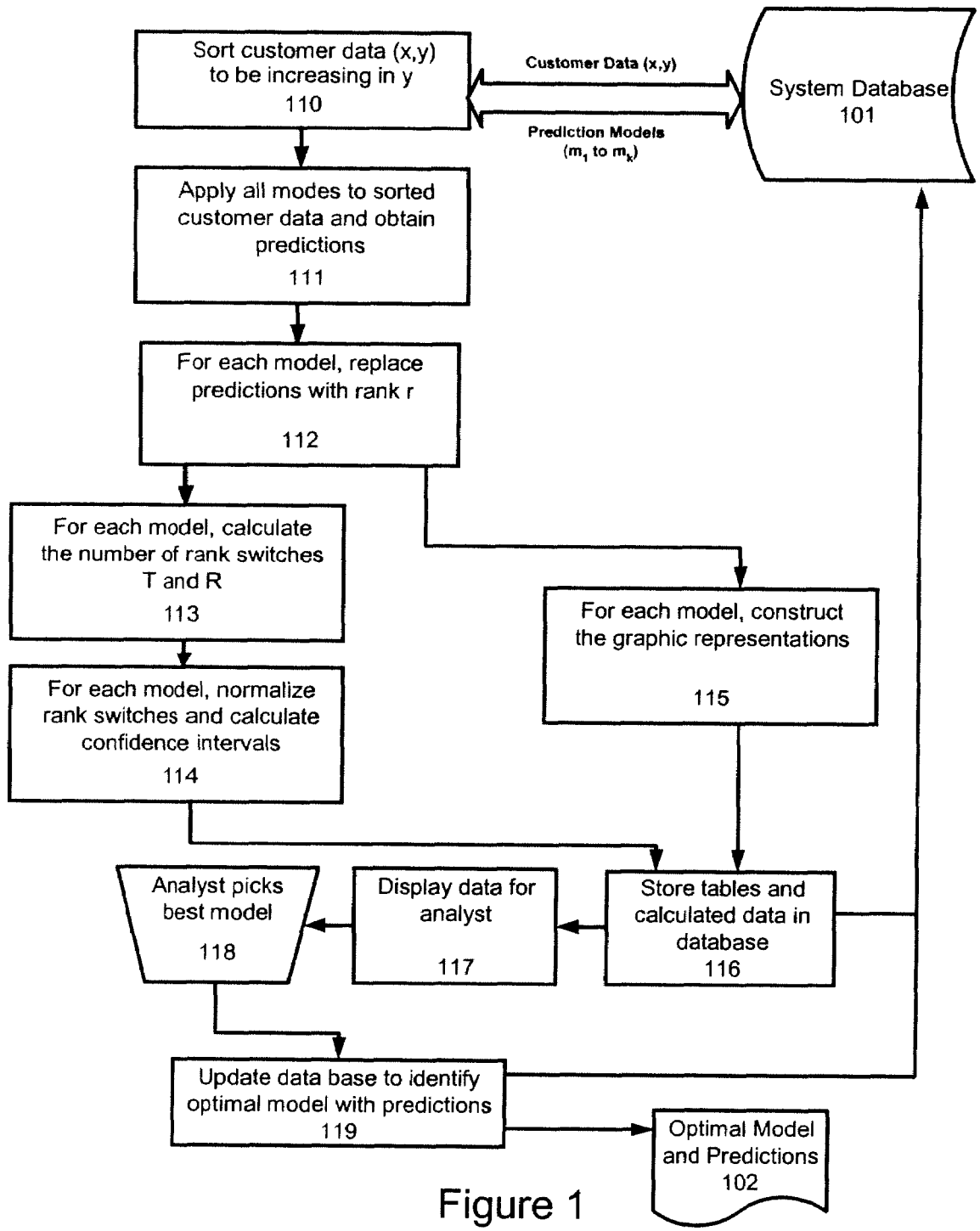
FIG. 1 is a flow diagram of the steps of the ranking-based method according to the present invention.

Referring now to the drawings, and more particularly to FIG. 1, there is shown a flow diagram of the steps of the invention method for performing ranking-based evaluation of the customer prediction models.

The method described here uses several relationships to evaluate the models and related model data. These relationships utilize the following variables:

n is a size of a set of customers with known value of y,
x is a matrix of customer properties of length n
y is a vector of observations of the response (revenue) of length n
$x_i$ is a matrix of are customer properties of length n after sorting by y
$y_i$ is a vector of observations of the response (revenue) of length n
$\hat{y}$ is a predicted response of the model y=m(x),
$s_i$ is the predicted rank for customer of said plurality of customers T is a number of rank order switches, and/or potential customers,
i is the integer from between 1 and n indexing sorted customers, also corresponds to the order of observed value y
j is an integer indexing customers
R is a weighted sum of order switches,
$\hat{\tau}$ is a probability of ranking switch,
$\hat{\rho}$ is a ranking correlation,
Ci is a number of observations that are concordant with observation i,
1−α is the confidence interval.

A database 101 contains customer data (x, y) where x are different properties of customers and y is the quantity of interest (e.g., the revenue generated by the customer). It should be noted that y is a vector and x is a matrix of length n and width equal to the number of different customer properties (also called features). The database also contains k models ($m_1, \ldots, m_k$) that for each customer can predict the quality of interest given $x_i$ where $\hat{y}_i = m_l(x)$.

In function block 110, the customer data (x, y) are sorted in increasing order of y and stored in the database 101. The resulting sorted customer data ($x_i, y_i$) has the property $y_i > y_j$ if i<j for i=1, . . . , n customers.

In function block 111, all models are applied to the sorted customer properties x to obtain predictions $\hat{y}_{li} = m_l(x_i)$ for all customers i from all models 1. In function block 112, calculations are made for each model l, the respective predicted rank $r_l$ of the predictions $\hat{y}_l$. Note that each $r_l$ is a vector of length n and that the order of the entries in vector r still reflects the order of the true value y. For example, if there are three customers with ordered revenue values $3, $15, $57 for which the model l prediction revenue values: $5.00, $100 and $0, the predicted ranking would be r=2, 3, and 1. Formally, $r_i$ is the rank of customer and/or potential customer i in this order:

$$s_i = |\{j \leq n | \hat{y}_i \leq \hat{y}_j\}|$$

The invention considers two ranking-based evaluation measures and their interpretations (e.g., ranking order entries in model ranking table, etc.). Function block 113 calculates for each model the number of ranking order switches:

$$T = \Sum_{i<j} 1\{s_i > s_j\} \quad (2)$$

and the weighted sum of order switches:

$$R = \Sum_{i<j} (j-i) 1\{s_i > s_j\} \quad (3)$$

The first measure simply counts how many of the pairs in the test data are ordered incorrectly by the model m(x). The second measure also considers these incorrect orderings, but weighs them by the difference in their model ranks, that is, a measure of the magnitude of error being committed. The results of each of these steps are stored electronically in the system database 101.

In function block 114, the ranks are transformed using resealing equations to put them into the range [−1, 1], where 1 corresponds to perfect model performance (T,R=0) and −1 corresponds to making all possible errors, thus attaining perfect reverse ranking. It is easy to verify that max(T)=n(n−1)=2, max(R)=n(n−1)(n+1)=6. The resealing equations are:

$$\hat{\tau} = 1 - \frac{4T}{n(n-1)} \quad (4)$$

$$\hat{\rho} = 1 - \frac{12R}{n(n-1)(n+1)} \quad (5)$$

Figure 3:
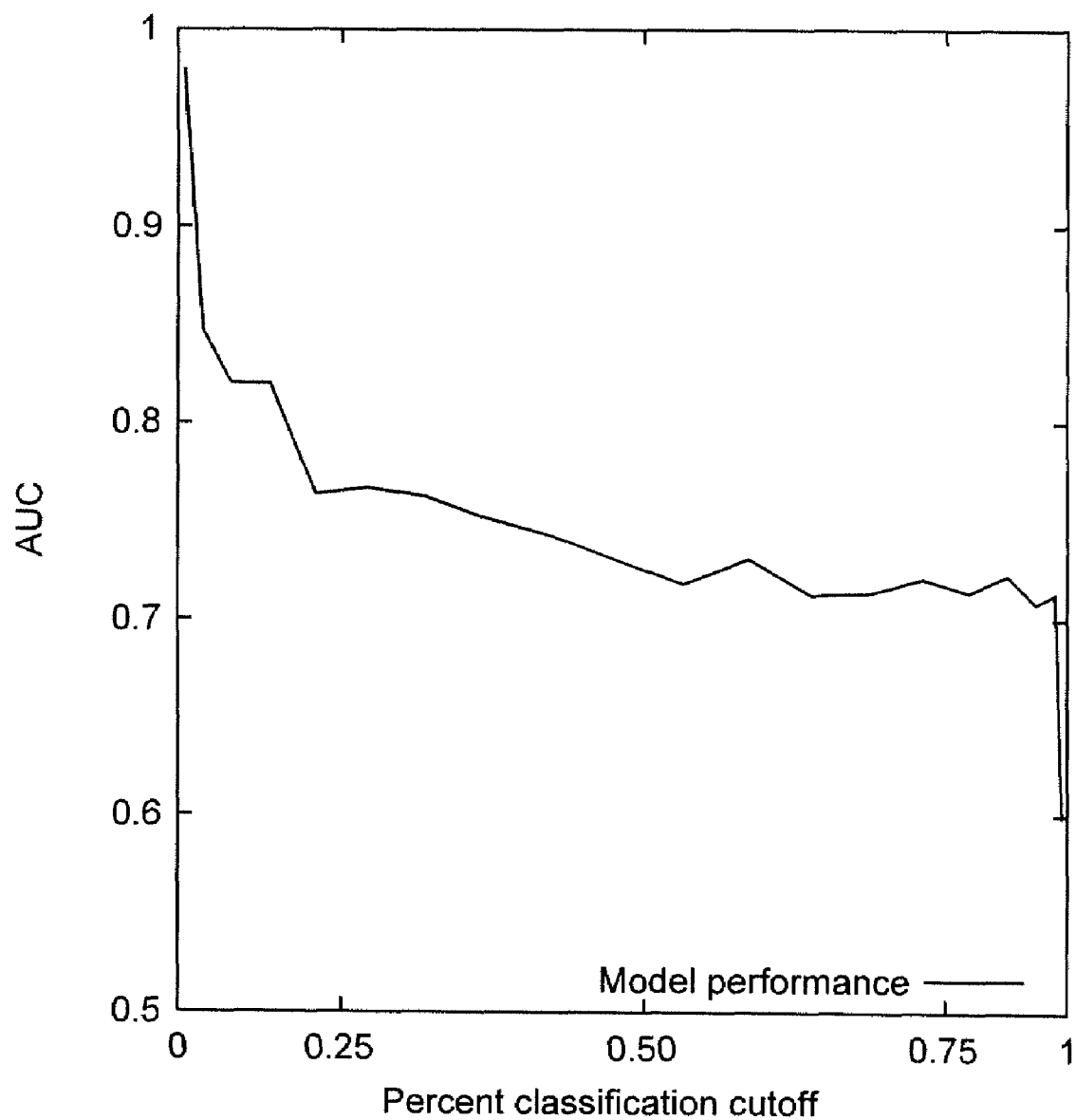
FIG. 3 is a visualization of the Area Under the Curve (AUC) values for the model being evaluated.

These values are similar to Kendall's τ which measures the strength of the relationship between two variables and Spearman's rank correlation. The moments of $\hat{\tau}$ and $\hat{\rho}$ under the relevant null assumptions (τ=0 and ρ=0, respectively) are calculated and a normal approximation gives a hypothesis testing methodology for the assumption of no correlation. For residual based measures, it is typically not possible to build confidence intervals without parametric assumptions and/or variance estimation. The non-parametric nature of $\hat{\tau}$ allows a general expression for its variance to be written as:

$$\text{Var}(\hat{\tau}) = \frac{8}{n(n-1)} (\pi_c(1-\pi_c) + 2(n-2)(\pi_{cc} - \pi_c^2)),$$

where $\pi_c = E(\hat{\tau}) = \frac{1}{2} + \frac{1}{2}\tau$ and $\pi_{cc}$ are two properties of the ranking function. This is then replaced with the sample means to obtain:

$$\text{V\^ar}(\hat{\tau}) = \quad (6)$$
$$\left(\frac{2}{n(n-1)}\right)^2 \cdot 2 \cdot \left(2\Sum_i C_i^2 - \Sum_i C_i - \frac{(2n-3)}{n(n-1)} \cdot \left(\Sum_i C_i\right)^2\right)$$

where $$C_i = \sum_{j<i} 1\{y_i > y_j\} + \sum_{j>i} 1\{y_i < y_j\}$$

is the number of observations that are "concordant" with observation i, that is, that their ranking relative to i in the model data agrees with the ranking by model scores (as plotted in FIG. 3). Function block 114 also calculates the confidence intervals for the values of evaluation measure given its sample value (the non-null case), as they represent the uncertainty in the model evaluation based on a single test set. Since $\hat{\tau}$ is asymptomatically normal, a 1−α confidence interval for $\hat{\tau}$ is:

$$\hat{\tau} \pm Z_{1-\alpha/2} \cdot \sqrt{\widehat{Var(\tau)}}$$

In function block 115, three graphical representations of the ordered switches are constructed: (1) percent of correctly ranked pairs involving a particular prediction, (2) AUC as a function of cutoff position, and (3) Lift-curve of the cumulative rank. Examples of these graphical representations are shown respectively in FIGS. 2, 3, and 4, respectively.

Figure 2:
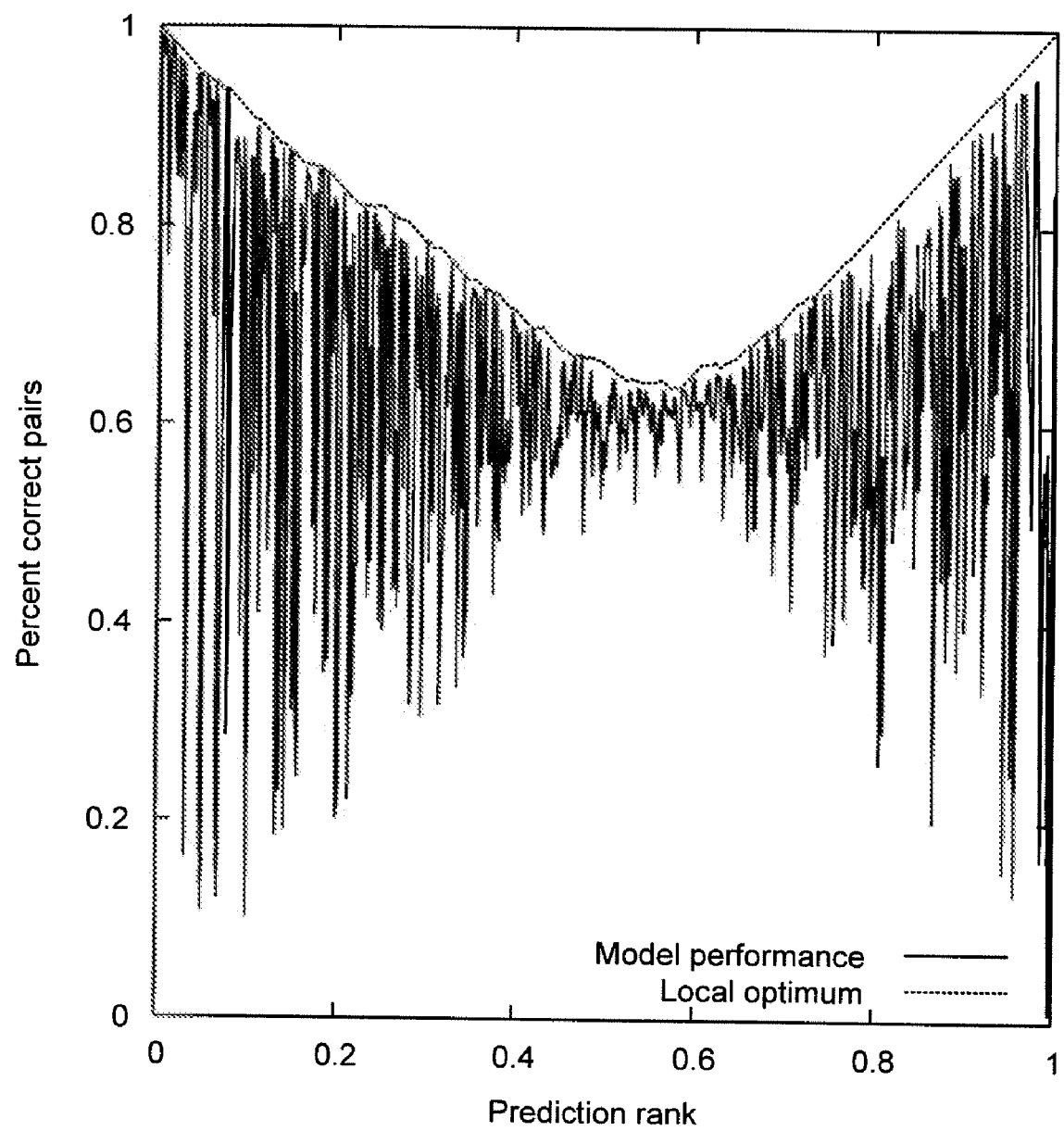
FIG. 2 is a visualization of a percent of correctly ranked pairs involving a particular prediction.

Starting from the largest model prediction $m(x_n)$, function block 115 calculates in decreasing order for each observation $x_i$ the percentage of correctly ranked pairs $(y_i, y_j)$ over all $j \neq i$. The percentage of correct pairings as a function of the inverse rank is shown in FIG. 2. The area above the curve is the sum of the percent incorrectly ranked pairs, which is equal to 2 T/n(n−1). Therefore, the area under the curve equals $\tilde{\tau}$. The dashed line corresponds to a locally optimal performance. A perfect model would show a constant performance of 100% correctly ranked pairs. But given that the model is not perfect and makes predictions that are sometimes too large or too small, even a perfect prediction for a particular observation with $m(x_i)=y_i$ will have a number of inversely ranked pairs due to errors of the other predictions. The upper limit of the performance for a given prediction, keeping everything else constant, is therefore not 100% but determined by the model performance of predictions around it. The interpretation of the locally optimal performance is the highest achievable percentage of correctly ranked pairs if $m(x_i)$ could be placed arbitrarily, given all other model predictions.

The performance in a particular region of the graph is characterized by two properties of the plot, 1) the distance of the local optimum from the 100% line, and 2) the distance of the actual performance from the local optimum. A particular region with a performance that on average remains very close to the local optimum has a nearly perfect ranking and is only disturbed by bad predictions that were either larger or smaller than the predictions of the region.

For FIG. 3, the original regression results are transformed into n−1 classification results, where the observations are discretized into a binary class variable $c^{(i)}(y_j)=1$ iff $y_j \geq y_i$ for all possible cutoffs 1<i<n.

For each classification $c^{(i)}$ the model performance is evaluated using the area under the ROC curve (AUC$_i$) (FIG. 3). The probabilistic interpretation of the AUC is the probability that a pair of observations with opposite class labels is ranked correctly. Since AUCi only considers pairs with different class labels under cutoff i, the number of pairs used to calculate AUCi is equal to i·(n−i) and the number of incorrectly ranked pairs under this cutoff is therefore:

(1−AUCi)·i·(n−i).

In function block 115 of FIG. 1, the total number of times a pair of observations will be assigned opposite class labels across all cutoffs is equal to the rank difference; i.e., a neighboring pair (k, k+1) receives opposite class labels only if the cutoff is equal to k whereas the extreme pair (1, n) will have opposite classes for all n−1 cutoffs. Given the definition in Equation (3) this implies that:

$\Sigma_i(1-AUC_i) \cdot i \cdot (n-i) = R$

Since each AUCi is rescaled by a different factor i·(n−i), a graph of the AUCi as a function of the cutoff i would not have an area equal to $\tilde{\rho}$. In order to achieve a direct correspondence with $\tilde{\rho}$, i·(n−i) units are allocated to AUCi by rescaling the x-axis accordingly. FIG. 3 shows such a transformation of the x-axis and has an area under the curve of $\tilde{\rho}$.

Figure 4:
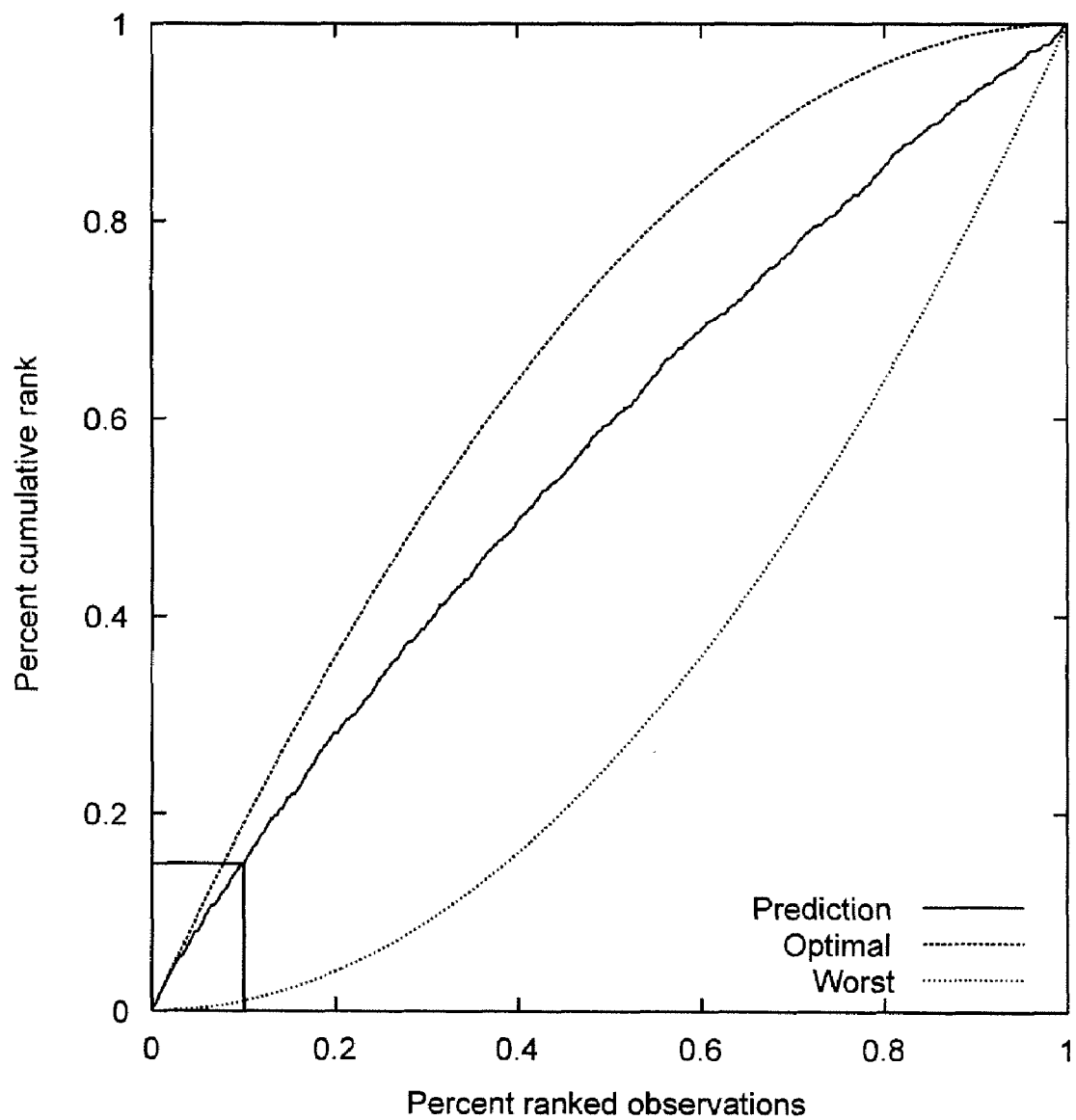
FIG. 4 is the approximate lift curve of the cumulative rank.

The plot in FIG. 4 is very close in spirit to a lift curve. After sorting the model predictions in decreasing order, the cumulative inverse rank of:

$p_i = \Sigma_{j=1}^{i}(n-s_j+1)$ is plotted for increasing cutoffs i in percent. Using the inverse rank emphasizes the model performance on the largest predictions that is shown in the bottom left of the graph. The model performance is bounded above by the optimal ranks $p_i = \Sigma_{j=1}^{i}(n-j+1)$ and below by the cumulative worst (inverse) ranking $w_i = \Sigma_{j=1}^{i} j$.

The area under the model curve is given as $\Sigma_{j=1}^{n}(n-i)(n-s_i)$ and can be shown to be equal to $n^3 - n^2 - n - R + \Sigma_{i=1}^{n} i^2$.

Once all models have been evaluated through function blocks 111-115, function block 116 stores the results and graphical representations in the system database 101. This information is then displayed for the analyst at display block 117. This display can be provided in any format (e.g., printed report, electronic display on a computer monitor, etc.) specified by the user. The analyst then evaluates the model based on the provided information in function block 118 and selects the model that can provide the suggested "best" list of potential customers for targeted sales and marketing efforts. The database is updated with these recommendations at function block 119 and a final report containing the optimal model and customer rankings is provided as the output 102 to be used by company personnel for targeted sales and marketing efforts.

While the invention has been described in terms of its preferred embodiment, those skilled in the art will recognize that the invention can be practiced with modification within the spirit and scope of the appended claims.

What we claimed is:

1. A computer-implemented ranking-based method for evaluating regression models by obtaining predictions y from one or more models to be evaluated on a test set of customers for which the true value y of the quantity of interest has been observed comprising the steps of:

storing the test set in an electronic database sorted in increasing order such that "large" corresponds to one of a plurality of customers and/or potential customers with largest perceived spending budget, and "small" corresponds to one of a plurality of customers and/or potential customers with smallest perceived spending budget;

applying all models to customer data from the test set to obtain predictions for the spending for each model and customer;

converting the predictions into ranks and storing for each model in one or more electronic databases as a model ranking table, a number of ranking order switches relative to ranking of the observed customer spending being calculated for each model and ranking order switches being defined as those changes in ranking position of the prediction relative to the order of the true observations y;

calculating a measure of a magnitude of erroneous ranking from a weighted sum of ranking order switches;

transforming the number of ranking switches and weighted sum of ranking order switches into a range of [−1, 1] wherein −1 corresponds to making all possible errors (inverse ranking) and 1 corresponds to a perfect model wherein said number of ranking switches has been transformed to represent a difference between a probability that the ranking of two customers and/or potential customers are in the same order versus the probability that two of the customers and/or potential customers are in different orders from the originally obtained rank;

normalizing transformed measures of order switches into a range of [0,1] wherein 1 corresponds to perfect ranking and 0 corresponds inverse ranking;

calculating a variance of measures of order switches and determining confidence intervals for each ranking measure, further comprising:

calculating using computing resources a variance that said measures of said ranking order switches,
wherein said calculating using computing resources a variance implements a relationship:

$$\text{Vâr}(\hat{\tau}) = \left(\frac{2}{n(n-1)}\right)^2 \cdot 2 \cdot \left(2\sum_i C_i^2 - \sum_i C_i - \frac{(2n-3)}{n(n-1)} \cdot \left(\sum_i C_i\right)^2\right)$$

wherein, a set of variables of said set of relationships includes:

$$C_i = \sum_{j<i} 1\{y_i > y_j\} + \sum_{j>i} 1\{y_i < y_j\}$$

is a number of observations that are concordant with observation i, i is an integer from 1 to (n−1),
j is an integer from (i+1) to n,
n is a size of a set of customers and/or potential customers, and
y is a predicted response of the model y=m(x);

calculating using computing resources a confidence interval for each measure of said ranking order switches; and constructing using computing resources graphical representations of said ranking order switches;

updating the model performance table with the ranking measures and their confidence intervals; and outputting the ranking measures and confidence levels as well as graphical representations thereof to a domain expert via electronic display on a computer monitor, who will choose based on this information the best model m* of the one or more models evaluated, and storing the predictions of y=m*(x) in the optimal prediction table.

2. The computer-implemented ranking-based method recited in claim 1, wherein the step of calculating a measure of a magnitude of erroneous ranking from a weighted sum of ranking order switches comprises the steps of:

calculating using computing resources a number of ranking order switches wherein ranking order switches are those changes in ranking order position of said plurality of customers and/or potential customers assuming said ranking obtained in said obtaining step was erroneous, and calculating using computing resources a weighted sum of ranking order switches wherein said weighted sum of ranking order switches provides a measure of the magnitude of erroneous ranking.

3. The computer-implemented ranking-based method of claim 2, wherein said calculating using computing resources the number of ranking order switches step comprises a relationship:

$$T = \Sigma_{i<j} 1\{s_i > s_j\}$$

wherein, a set of variables of said relationship includes:
T is a number of rank order switches,
$s_i$ is a rank order of one customer of said plurality of customers and/or potential customers,
i is an integer from 1 to (n−1),
j is an integer from (i+1) to n, and
n is a size of a set of observed customers.

4. The computer-implemented ranking based method recited in claim 2, wherein said calculating using computing resources a weighted sum of order switches step comprising a relationship:

$$R = \Sigma_{i<j}(j-i)1\{s_i > s_j\}$$

wherein, a set of variables of said relationship includes:
R is a weighted sum of order switches,
$s_i$ is a rank order of one customer of said plurality of customers and/or potential customers,
i is an integer from 1 to (n−1),
j is an integer from (i+1) to n, and
n is a size of a set of observed customers.

5. The computer-implemented ranking-based method recited in claim 1, wherein the step of outputting the ranking measures and confidence levels comprises the steps of:

providing an output that presents an updated ranking of said plurality of customers and/or potential customers that corresponds to a model obtained in said applying step with the highest confidence interval of said all models; and/or providing an output of a model recommendation that corresponds to a best model of said all models evaluated.

6. The computer-implemented ranking-based method recited in claim 1, wherein the step of transforming said number of ranking switches and said weighting sum of order switches step implements a set of relationships:

$$\hat{\tau} = 1 - \frac{4T}{n(n-1)}, \text{ and}$$

$$\hat{\rho} = 1 - \frac{12R}{n(n-1)(n+1)}$$

wherein, a set of variables of said set of relationships includes:
$\hat{\tau}$ is a probability that the ranking order has been changed,
n is a size of a set of customers and/or potential customers,
$\hat{\rho}$ is a ranking correlation,
T is a number of rank order switches, and
R is said weighted sum of order switches.

7. The computer-implemented ranking-based method recited in claim 1, wherein the step of outputting provides an updated ranking of a plurality of customers and/or potential customers that corresponds to a model obtained in said applying step with the highest confidence interval of said all models.

* * * * *